United States Patent [19]

Goto

[11] Patent Number: 4,646,191
[45] Date of Patent: Feb. 24, 1987

[54] RECORDING TAPE CASSETTE

[75] Inventor: Shinichi Goto, Kyoto, Japan

[73] Assignee: Hitachi Maxell, Ltd., Osaka, Japan

[21] Appl. No.: 861,656

[22] Filed: May 5, 1986

Related U.S. Application Data

[63] Continuation of Ser. No. 553,071, Nov. 18, 1983, abandoned.

[30] Foreign Application Priority Data

Nov. 20, 1982 [JP] Japan .......................... 57-175774[U]

[51] Int. Cl.[4] .................... G11B 23/02; G03B 1/04
[52] U.S. Cl. .................................... 360/132; 242/199
[58] Field of Search .............. 360/132; 242/197–200; 206/387

[56] References Cited

U.S. PATENT DOCUMENTS 4,004,752  1/1977  Kamaya ........................ 242/198
4,358,070  11/1982  Okamura ...................... 242/197

Primary Examiner—A. J. Heinz
Attorney, Agent, or Firm—Birch, Stewart, Kolasch & Birch

[57] ABSTRACT

In a recording tape cassette having a front lid for protecting the front part of the cassette, the front lid body being exerted by a spring member normally towards the closed direction when the front lid is assembled on the tape cassette, a temporary spring receiving member is formed on the front lid so that before the front lid is assembled on the cassette, one end of the spring member is temporarily received by the temporary spring receiving member to prevent removal of the spring member from the front lid during the manufacturing process.

4 Claims, 10 Drawing Figures

FIG. 5
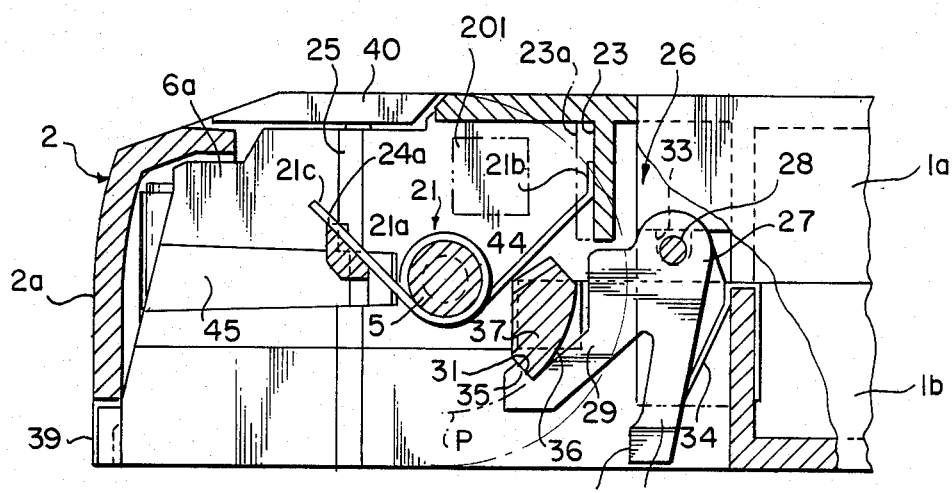
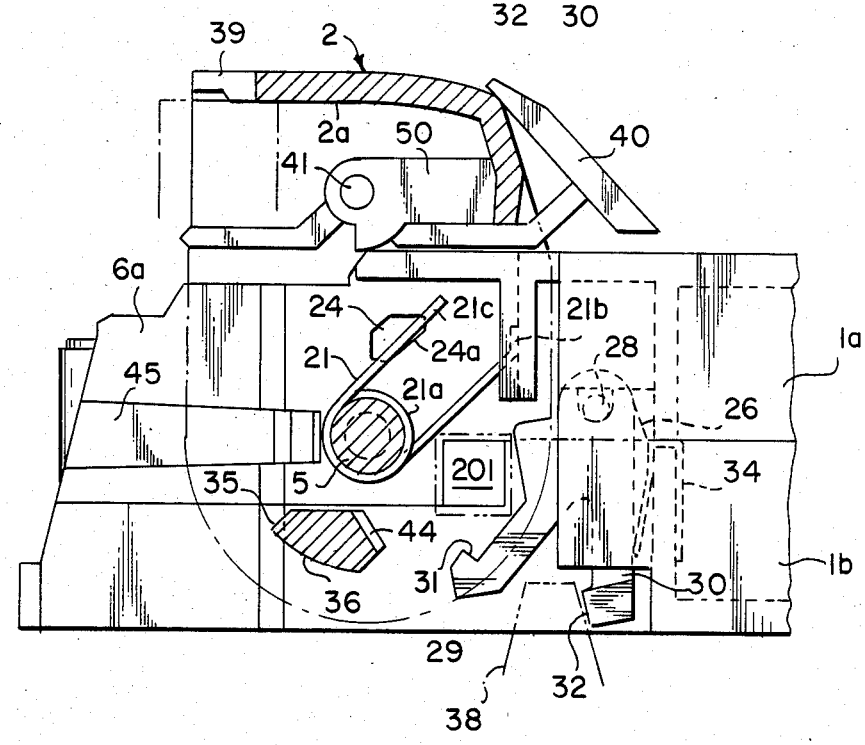
FIG. 6

– 1 –

RECORDING TAPE CASSETTE

This application is a continuation of application Ser. No. 553,071 filed on Nov. 18, 1983, now abandoned.

FIELD OF THE INVENTION

The present invention relates to a recording tape cassette furnished with a front lid for protecting a recording tape in a freely openable manner on a front face of the tape cassette.

BACKGROUND OF THE INVENTION

In a video tape cassette for a video tape recorder as shown in FIGS. 1 to 3, a front lid 2 is pivotaly mounted on a cassette 1 in a rotatable manner to open and close, the front lid 2 being always forced to turn to a closed position by a twist coil spring 21. When the tape cassette is used, the front lid 21 can be opened to draw out the recording tape 3 forward from the front face of the cassette 1, while during non-use, the front lid 2 is closed to cover the front side of the recording tape 3 for protection.

What is problematic here is the troublesome work required for setting the twist coil spring 21 in position. Generally, a tape cassette is assembled in the following manner: At the front ends of the right and left side walls 6,6 of the tape cassette 1, a pair of bearing holes 4,4 for receiving bearing pins 5 of the front lid 2 are provided. Bearing pins 5,5 projected inwardly on the right and left side walls 2b of the front lid 2 are freely rotatably inserted into the bearing holes 4. The twist coil spring 21 is accommodated on the bearing pin 5 between one side wall 6 of the tape cassette 1 and the corresponding side wall 2b of the front lid 2, with one end arm 21b of the twist coil spring 21 being engaged with the side wall 6 and the other end arm 21c to the side wall 2b of the front lid 2, respectively, so that, by the spring action of the twist coil spring 21 the front lid 2 is always forced to turn in a closing direction. As such, it is necessary to set the twist coil spring 21 in a narrow space between the side wall 6 of the tape cassette 1 and the side wall 2b of the front lid 2, and moreover, in such a narrow space, the twist coil spring 21 has to be applied to bridge over the one wall of the tape cassette 1 and the front lid 2. Thus, setting the twist coil spring in position is extremely difficult. Especially, in the case of making the size of the tape cassette for a small sized video recorder such as 8 mm video tape recorder miniature, the twist coil spring 21 itself has to be made extremely small in size, and the space between the side wall 6 of the tape cassette 1 and the side wall 2b of the front lid 2 into which the coil spring is to be fitted becomes extremely narrow to make setting of the twist coil spring 21 extremely difficult. Thus, improvement of this feature has been desired.

SUMMARY OF THE INVENTION

Accordingly an essential object of the present invention is to provide a tape cassette which enables the assembly of the spring member for lid locking means easily and to improve the work for assembling the spring member in the tape cassette.

Another object of the present invention is to provide a recording tape cassette which enables to prevent removal of the spring member for exerting a force to the front lid to rotate it towards the closed position during manufacturing process.

BRIEF DESCRIPTION OF THE DRAWINGS

FIG. 5 is a sectional view of FIG. 4 taken along the line V—V, FIG. 6 is a sectional view corresponding to FIG. 5 shown under the condition of the front lid being opened.

DETAILED DESCRIPTION OF THE PREFERRED EMBODIMENT

Figure 1:
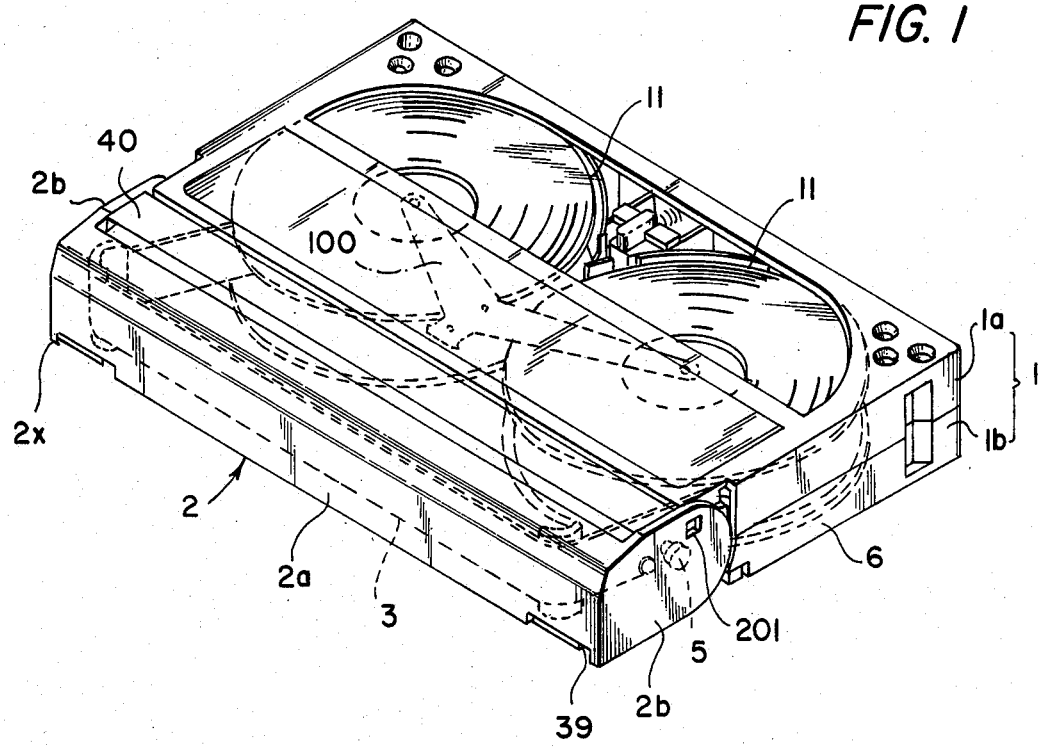
FIG. 1 is a perspective view to illustrate the tape cassette according to the present invention with the condition of the front lid being closed.

FIGS. 1 to 4 illustrate a small sized video tape cassette for miniature video tape recorder. The tape cassette 1 comprises a top section 1a and a bottom section 1b assembled together to provide a tape chamber in a known manner. The top section 1a and the bottom section 1b are made of a plastic resin material. On the right and left parts inside the tape cassette 1, a pair of tape reels 11 on which a recording tape 3 is to be wound are rotatably mounted on driving shaft insertion holes 13 opened on the bottom wall 12 of the bottom section 1b, and a pair of tape drawing openings 14 are formed on the right and left parts of the front face of the tape cassette 1. Through these tape drawing openings 14 the recording tape 3 is led out from one tape reel 11 to the front of the cassette and taken up onto the other reel 11. At the central part of the front side of the tape cassette 1, over the right and left tape drawing openings 14 a pocket 15 for accommodating a tape loading pin and a tape guide pin provided on the video tape recorder is defined inwardly toward the inside of the cassette 1. At the central part in the direction of right and left rearward in the tape cassette 1, there is a reel brake assembly 18 in which the brake members 17 act to engage with or disengage from the engaging teeth 16 formed on the outer peripheries of the lower flanges 11a of the tape reels 11.

The tape reels 11 are respectively rotatably supported by a spring plate 100 secured on the inner surface of the top section 1a. The way of securing the spring plate will be described later with reference to FIG. 10.

The front lid 2 is made of a plastic resin material having a front plate 2a which covers the front face of the cassette 1 over its whole length, right and left side arms 2b projecting backward from the right and left ends of the front plate 2a, and bearing pins 5 projected oppositely inside the right and left side walls 2b at the different lengths. The right and left side arms 2b are placed opposing to the outer surface of the front end portions of the right and left walls 6 of the tape cassette 1 with the bearing pins 5 rotatably fitted in the corresponding bearing holes 4.

The front lid 2 is freely rotatable around the bearing pin 5 to the closed position of the front surface of the tape cassette 1 and to the open position. The front lid 2 is forced to turn in a closing direction by the twist coil spring 21 fitted to the bearing pin 5 on the right side in FIG. 3. When the tape cassette is not in use, the front lid 2 is closed to cover and protect the outside of the recording tape 3. When the tape cassette is mounted on the video tape recorder, the front lid 2 is opened, and the tape loading pin on the video tape recorder enters into the pocket 15 on the front side of the tape cassette 1 to draw out the recording tape 3 forward from the case.

Figure 4:
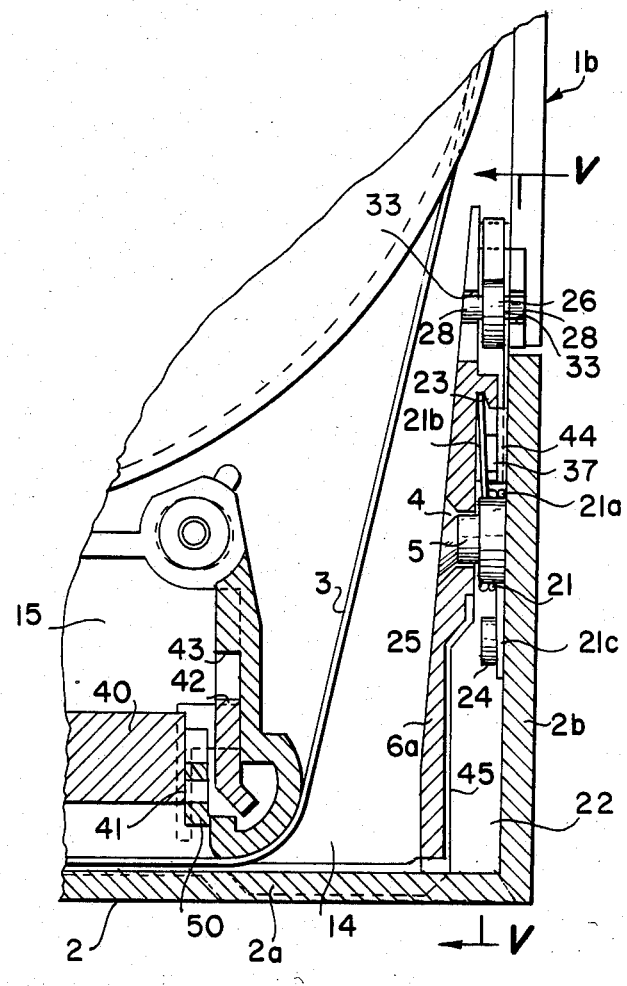
FIG. 4 is an enlarged plan view of the bearing structural part of the front lid.

Referring to FIG. 4, in the space between the front end 6a of the right side wall 6 of the tape cassette 1 and the right side arm 2b of the front lid 2 there are set in the above mentioned twist coil spring 21 and a means of locking the front lid 2 to the closed position while the tape cassette 1 is not in use. As shown in FIG. 5, the twist coil spring 21 is set at its intermediate coil part 21a around the bearing pin 5, at its one arm 21b detachably fitted and supported in a vertical slot 23a which is defined to open toward the front direction in a front surface of a spring bearer 23 formed on the front portion 6a of the external surface of the right side wall 6 of the tape cassette 1, and at its other arm 21c received and supported by a spring bearer 24 provided inside the right side wall 6 of the front lid 2 with the free end portion of the other arm 21c fitted in a recess 24a defined on the upper face of the spring bearer 24.

In FIGS. 4 to 6 there is illustrated an arrangement 26 for closing and locking the front lid 2 accommodated in the space 22. In a plan view the space 22 is so defined that the width on the front portion of the space is wider than the width on the rear portion, bordered by the stepped slope 25 of the front end wall 6a of the bottom section 1b. The locking member 26 is a one-piece plastic molding product provided with transverse pins 28 projecting from the right and left sides of the head part 27 and with a front 29 and a rear leg 30 extended downwardly from the head part 27. At the lower end of the front leg 29 an engaging member 31 of a hook shape is formed. The front face of the lower end of the rear leg 30 is formed into a bearing surface 32 for the lock releasing member to be described later.

The lock member 26 is suspended in a manner freely swingable back and forth by transverse pins 28 on the bearings 33 formed between the upper end of the right side wall 6 of the tape cassette 1 and the lower end of the top section 1a, and is forced in a forward direction under pressure exerted by a plate spring 34 disposed behind the lock member 26.

Figure 9:
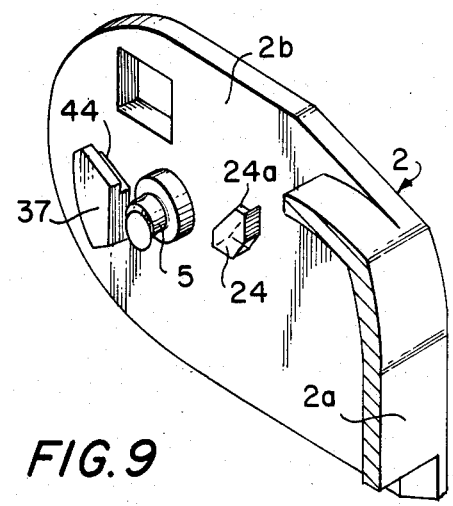
FIG. 9 is a perspective view to show the inner surface of the right side wall of the front lid.

As shown in FIG. 9, on the inside of the right side arm 2b of the front lid 2 there is provided in an engaging projection 37 which has an engaging surface 35, a curved guide surface 36, and a temporary spring stopper 44 comprising a groove. The positional relations are such that, when this engaging projection 37 is positioned on the side rearward to the bearing pin 5 of the front lid 2 to have forced the lock member 26 to swing forward, the lower end engaging surface 31 of the front leg 29 is moved from below to come into contact engagement with the engaging surface 35 of engaging projection 37 of the front lid 2 under the closing position.

In other words, when the tape cartridge is not in use, the engaging surface 31 of the lock member 26 which has been forced forward pressed by the plate spring 34 is moved in a forward direction from below to come into a resilient contact with the engaging surface 35 on the side of the front lid 2 which is in the closing position. However, as the engaging surface 31 of the lock member 26 is so set as to make surface abutment to the engaging surface 35 under the condition where it meets nearly at right angles with the locus of rotation P of the engaging surface 35 when the front lid 2 is turned to the opening mode, the said surface 31 securely locks the front lid 2 from rotating for upward opening around the bearing pin 5 when the tape cassette 1 is not in use. When the tape cassette is set on the video tape recorder, as shown in FIG. 6, the lock releasing member 38 on the side of the magnetic recorder is guided forward to enter into the space 22 via a notch 39 formed at the lower end of the front plate 2a of the front lid 2 and pushes the lower end receiving surface 32 of the rear leg 30 of the lock member 26. By this movement the lock member 26 swings backward resisting the force of the plate spring 34, and the above engaging surface 31 of the lock member shifts downward further exceeding the locus of rotation P of the engaging surface 35 on the side of the front lid 2 to release lock of the front lid 2. Then, a fixed lever (not illustrated) provided on the video tape recorder comes into contact with the corner 1x of the front lid 2 pushing the front lid 2 to turn upward for opening when the cassette is moved downwardly for setting the cassette in position.

When the operation in the video tape recorder is over, the lock releasing member 38 and the fixing lever reaches the position of non-use mode, then the lock member 26 is pushed forward to swing under the spring force of the plate spring 34, and the engaging surface 31 of the lock member 26 is guided to be in contact with the curved guide surface 36 on the side of the front lid 2 which is about to be returning to the lid-closing position under the action of the twist coil spring 21. Simultaneously with completion of closing of the lid, the above engaging surface 31 is engaged with the engaging surface 35 of the engaging projection 37 to lock the front lid 2.

Figure 2:
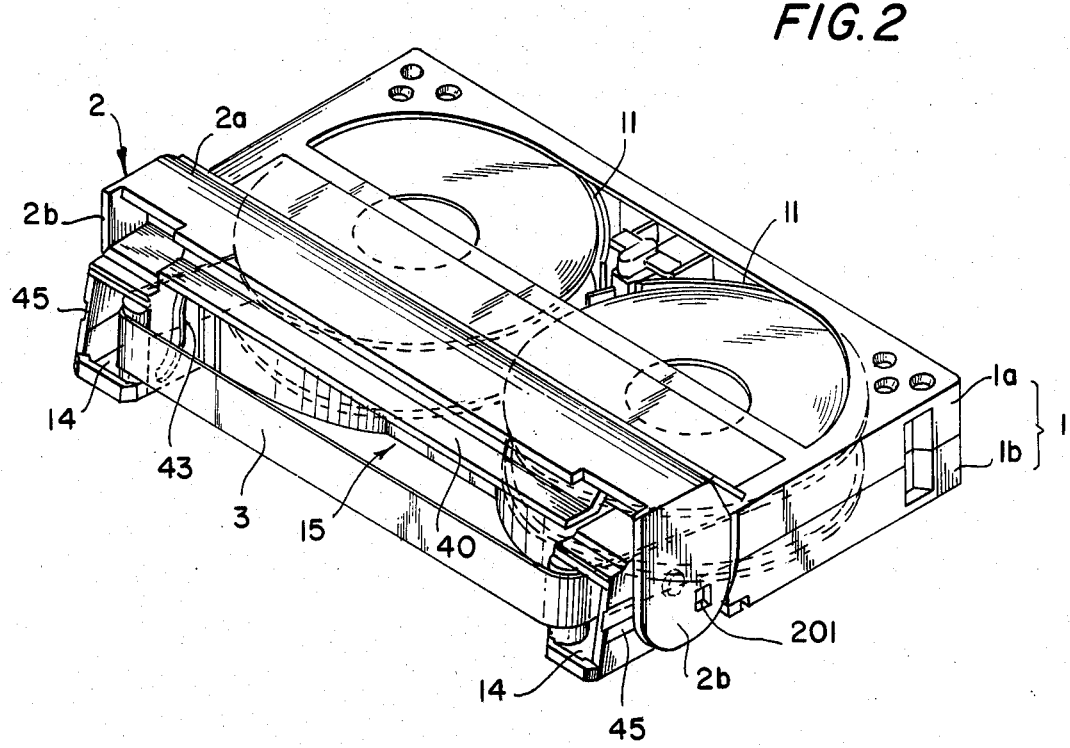
FIG. 2 is a perspective view to show the arrangement shown in FIG. 1 with the condition of the front lid being opened.
Figure 3:
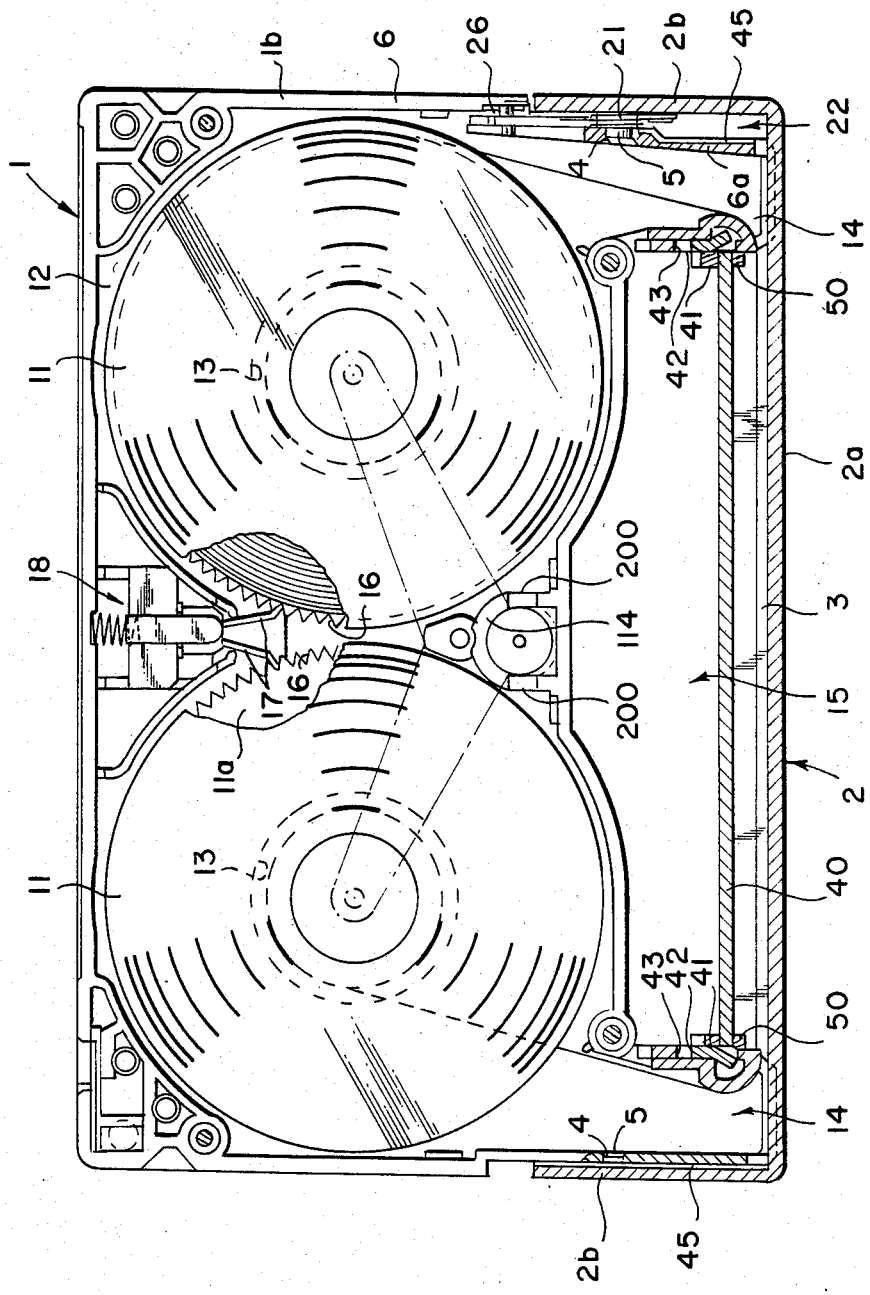
FIG. 3 is a plan view to show the inside.
Figure 7:
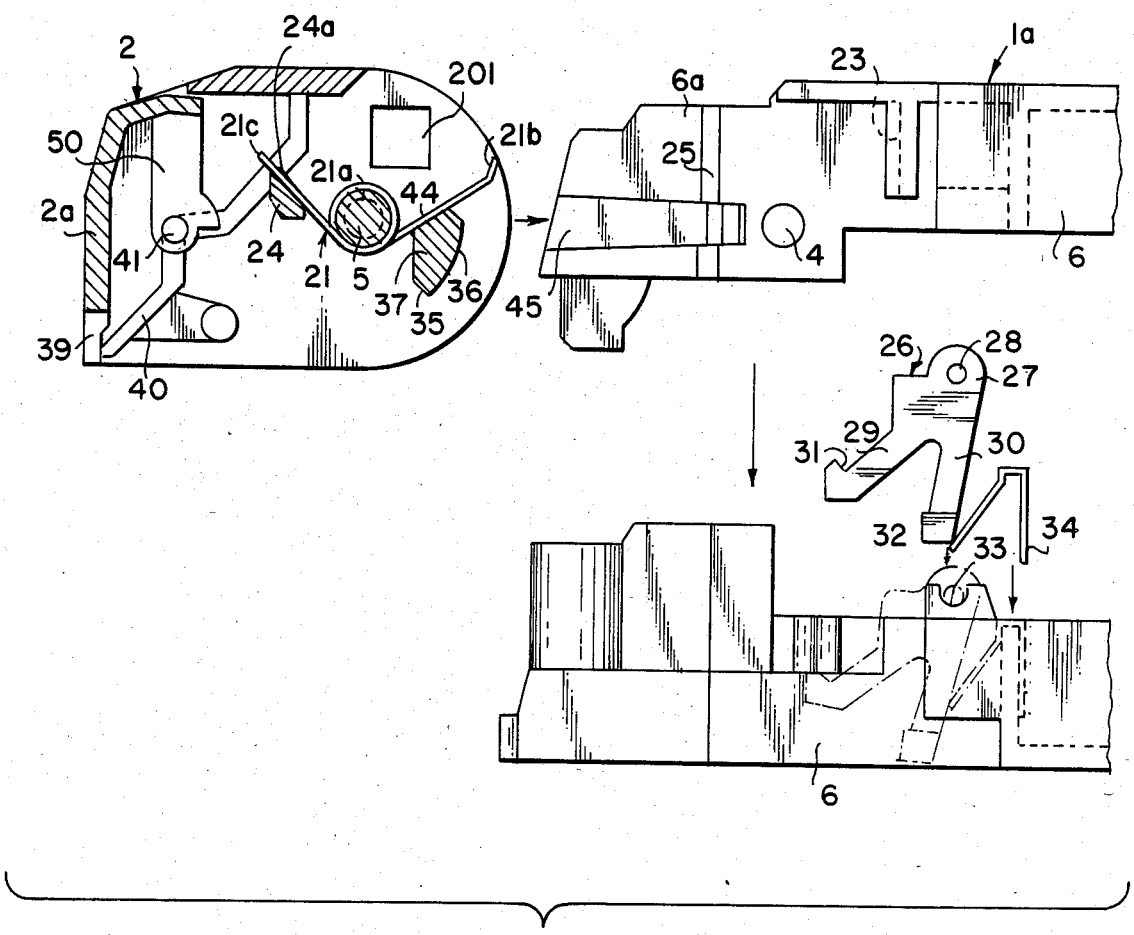
FIG. 7 is a side view to show the order of assembly of front lid, upper case element, and lower case element.

As shown in FIGS. 2, 3, and 7, respectively, between the cover supporting pieces 50 inside the front lid 2, there are freely swingably provided the right and left pins 41 for the dust cover 40, so that when the cartridge is not in use the inside including the lower edge of the recording tape and the open upper face of the pocket 15 are tightly closed to prevent dust from depositing on the tape 3. The dust cover 40 has cam pins 42 engaged in the cam grooves 43 provided on the right and left lateral sides of the pocket 15. With the opening of the front lid 2, the dust cover 40 shifts upwardly together with the front lid 2 along the cam grooves 43 without interfering with the tape 3 at all.

An example of a procedure of assembling the front lid 2, the top section 1a, and the bottom section 1b is explained. The dust cover 40 is fitted to the front lid 2, and a twist coil spring 21 is temporarily set, then the front lid 2 is assembled in the top section 1a, and in turn the top section 1a and the bottom section 1b are joined together to form the complete tape cassette 1.

To explain the assembling order in more detail, as shown in FIG. 7, firstly the right and left pins 41 of the dust cover 40 are set in a manner to swing freely back and forth between the supporting pieces pin 5 inside the right side arm 2b of the front lid 2, the intermediate coil part 21a of the twist coil spring 21 is mounted. The arm 21b at the end of the twist coil spring 21 is temporarily rested in the groove of the temporary spring stopper 44 of the engaging projection 37, and the other end arm 21c of the twist coil spring 21 is stopped by the spring bearer 24. In other words, the twist coil spring 21 is preliminarily assembled onto the front lid 2.

Figure 8:
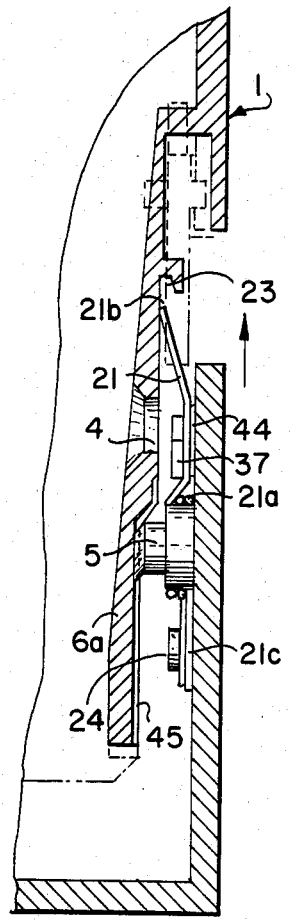
FIG. 8 is a plan view to show the condition of setting the front lid onto the upper case element.

Then, the front lid 2 is inserted into the top section 1a from its front rearward, and the right and left bearing pins 5 are shifted backward along the guide grooves 45 formed on the front end outer surfaces of the right and left side walls 6 of the top section 1a in the horizontal direction. Then, as shown in FIG. 8, the end arm 21b of the twist coil spring 21 on the right side bearing pin 5 is fitted into the groove 23a of the spring bearer 23 on the side of the top section 1a to come into a resilient engagement. Further, when the front lid 2 is shifted backward, the end arm 21b of the twist coil spring 21 comes into strong resilient contact with the inside of groove of the spring bearer 23, whereby the intermediate portion of the twist coil spring 21 leaves away from the temporary spring stopper 44 on the side of the front lid 2, and the bearing pin 5 goes into the front lid bearing hole 4 to give ultimately the assembly condition under which the twist coil spring 21 rotates in exert force to a direction of closing the front lid 2.

Then, on dropping from upward the transverse pins 28 of the bearing 33 at the upper end of the right side wall 6 of the bottom section 1b, the lock member 26 is supported in suspension, and the plate spring 34 is arranged behind the lock member 26. Finally, the top section 1a and the bottom section 1b are assembled together to form a complete tape cassette.

The full aspect of the illustrated embodiment is as explained above, but it is to be understood that the present invention is not limited thereto. For example, instead of the system of pre-assembling the twist coil spring 21 onto the front lid 2 and setting the front lid 2 from the front to the back of the tape cassette 1, the front lid 2 may be set downward from above the tape cassette 1. Alternatively, in providing the temporary spring stopper 44 on the inner surface of the side wall 2a of the front lid 2, instead of providing it onto the engaging projection 37, it may be provided on the inner surface of the side wall 2a as a separate member from said engaging projection 37.

As explained above, according to the present invention it is designed to provide a temporary spring stopper 44 for temporarily stopping the one end arm 21b of the twist coil spring 21 on the side wall 2b of the front lid 2 in a manner to permit engagement and detachment, so that, by mounting the front lid 2 onto the tape cassette 1 under the condition of the twist coil spring 21 being temporarily stopped, the end arm 21b of the twist coil 55 spring 21 is brought into spring contact with the spring bearer 23 on one side of the body case 1 and disengaged from the temporary spring stopper 44. Therefore, the present efficient performance of the setting work of the twist coil spring 21.

Figure 10:
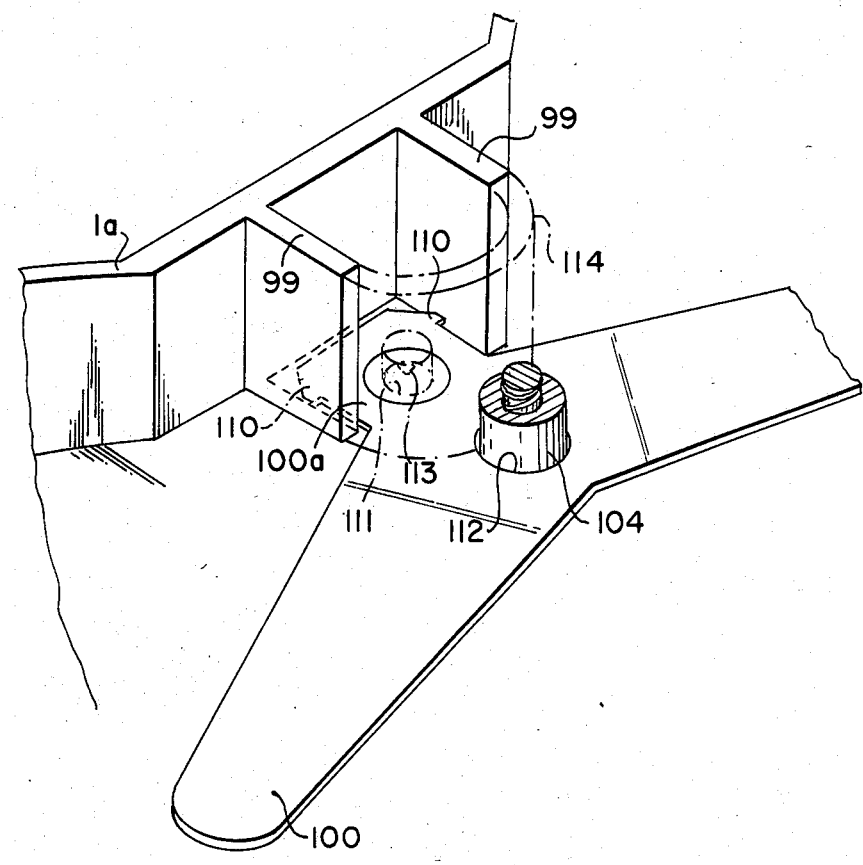
FIG. 10 is a perspective view showing an example of fixing a spring plate used in the recording tape cassette according to the present invention.

Referring to FIG. 10, there is shown an example of a way of securing the spring plate 100 on the inner surface of the top section 1a. The spring plate 100 of a generally V shape has its central portion through holes 111 and 112 and a projected engaging plate 100a with a pair of hooked portions 110 formed. The spring plate 100 is secured by inserting the engaging plate 100a in the gap defined by the opposed wall members 99 formed on the top section with the hooked portions 110 engaging with the inner surfaces of the wall members 99. Furthermore, the hole 112 is fitted with the projection 104 formed on the inner surface of the top section 1a, thus, the spring plate 100 can be situated on the top section 1a. The through hole 111 is engaged with a projection 113 formed on the top section 1a and in turn the projection 113 is thermally calked and the spring plate 100 is secured in position. Since the spring plate 100 is engaged with the projections 104 and 113, the spring plate 100 can be fixed without rotation.

When the top section 1a and the bottom section 1b are assembled, an arcuated wall 114 formed on the bottom section 1b is positioned as shown in chain lines in FIG. 10 so that the arcuated wall 114 closes the front side of the gap, thereby preventing leakage of light of a lamp inserted in the gap for detecting the tape ends. It is noted that the lays of light of the lamp are adapted to pass a pair of holes 200 (see FIG. 3) and a pair of through holes 201 defined on the front lid 2.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A recording tape cassette comprising
a cassette body including a top section and a bottom section together forming a tape chamber, the combined sections forming right and left side walls and a front face, said side walls extending parallel with each other and perpendicular to a vertical plane of said front face, each side wall having a front, stepped recessed portion;
a front lid member for covering said front face of said cassette body including a front plate and right and left side arms which project away from opposite ends of said front plate of said lid member, rotatably mounted on said cassette body, supported respectively by said right and left arm members on said right and left side walls of said cassette body so as to rotate between a closed position whereby the lid member closes the front face of said cassette body and an open position whereby the lid member opens the front face of said cassette body, said stepped recessed portions of said respective side walls of said cassette body and said side arms of said front lid member defining respective spaces therebetween when said lid member is in said closed position;
a resilient spring member accommodated in at least one of said spaces defined by said respective stepped recessed portions of said side walls of said cassette body and corresponding arm of said front lid member, said resilient spring member having a first end engaged in a slot in a front surface of a first spring bearer on said respective stepped recessed portion of said respective side wall and a second end engaged with a second spring bearer provided on an inside wall of a corresponding side arm of said front lid member such that said front lid member is exerted to rotate to a closed position; and
a temporary receiving member formed on said respective side arm of said front lid member forward to said first spring bearer for temporarily receiving said first end of said resilient spring member before said front lid member is mounted in said cassette body, whereby said first spring bearer is provided on said stepped recessed portion of said respective side wall for engaging with said first end of said resilient spring member upon assembly of said front lid member in position in said cassette body thereby causing said first end of said resilient spring member to be displaced from said temporary receiving member to said first spring bearer.

2. The recording tape cassette according to claim 1, wherein said resilient spring member is a twisted coil spring having an intermediate portion of said first end for engaging with said temporary receiving member and an end arm for engaging with said slot in said first spring bearer upon assembly in said cassette body.

3. The recording tape cassette according to claim 2, wherein said temporary receiving member is provided with a recess for receiving said intermediate portion of said first end of said resilient spring member.

4. The recording tape cassette according to claim 1, wherein said temporary receiving member is provided with an engaging surface for engagment with a hook member of a lid locking device for locking said front lid member in a closed position.

* * * * *